United States Patent
Fei et al.

(10) Patent No.: US 12,082,127 B2
(45) Date of Patent: Sep. 3, 2024

(54) DATA TRANSMISSION METHOD, APPARATUS, AND SYSTEM

(71) Applicant: Huawei Technologies Co., Ltd., Shenzhen (CN)

(72) Inventors: Yongqiang Fei, Shenzhen (CN); Xinqian Xie, Beijing (CN); Zhiheng Guo, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 340 days.

(21) Appl. No.: 17/538,600

(22) Filed: Nov. 30, 2021

(65) Prior Publication Data

US 2022/0095248 A1  Mar. 24, 2022

Related U.S. Application Data

(63) Continuation of application No. PCT/CN2020/092720, filed on May 27, 2020.

(30) Foreign Application Priority Data

May 31, 2019 (CN) .......................... 201910472678.2

(51) Int. Cl.
*H04W 52/54* (2009.01)

(52) U.S. Cl.
CPC .................................. *H04W 52/54* (2013.01)

(58) Field of Classification Search
CPC . H04W 52/146; H04W 52/367; H04W 52/38; H04W 52/02; H04W 52/00;
(Continued)

(56) References Cited

U.S. PATENT DOCUMENTS

2016/0205631 A1* 7/2016 Chen .................... H04W 52/367
                                                            455/522
2016/0330633 A1* 11/2016 You ........................ H04W 16/26
(Continued)

FOREIGN PATENT DOCUMENTS

CN     107211375 A    9/2017
CN     108810964 A    11/2018
(Continued)

OTHER PUBLICATIONS

Huawei, HiSilicon, "PUSCH for MTC and Coverage Enhancement," 3GPP TSG RAN WG1 Meeting #82, 3GPP Draft, Aug. 23, 2015, XP051001207, R1-153759, total 6 pages, 3rd Generation Partnership Project, Valbonne, France, Aug. 24-28, 2015. (Year: 2015).*

(Continued)

*Primary Examiner* — Angelica Perez
(74) *Attorney, Agent, or Firm* — Leydig, Voit & Mayer, Ltd.

(57) ABSTRACT

Embodiments of this application provide a data transmission method, an apparatus, and a system. The method includes: A terminal device determines first transmission time, and sends uplink data at a first power within the first transmission time. Correspondingly, a network device determines the first transmission time, and receives the uplink data within the first transmission time. Second transmission time includes the first transmission time, the first transmission time includes N1 time units, the second transmission time includes N2 time units, N1 is a positive integer, and N2 is a positive integer greater than N1.

14 Claims, 8 Drawing Sheets

(58) Field of Classification Search
CPC ..... H04W 52/30; H04W 52/36; H04W 52/58; H04W 52/54; H04L 1/1819; H04L 1/1887; H04L 1/1893
See application file for complete search history.

(56) References Cited

U.S. PATENT DOCUMENTS

2016/0381674 A1* 12/2016 Kim ................ H04L 1/1819
 370/329
2018/0227912 A1* 8/2018 Chen ................ H04L 5/0048

FOREIGN PATENT DOCUMENTS

| CN | 108886778 | A | 11/2018 |
|----|-----------|---|---------|
| CN | 109088703 | A | 12/2018 |
| EP | 3079272 | A1 | 10/2016 |
| WO | 2018088857 | A1 | 5/2018 |

OTHER PUBLICATIONS

Huawei, HiSilicon, "PUSCH for MTC and Coverage Enhancement," 3GPP TSG RAN WG1 Meeting #82, 3GPP Draft, Aug. 23, 2015, XP051001207, R1-153759, total 6 pages, 3rd Generation Partnership Project, Valbonne, France (Aug. 24-28, 2015).

\* cited by examiner

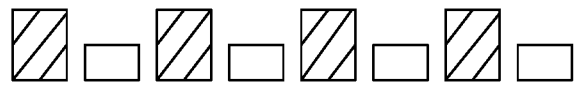

Time units included in first transmission time

Time units included in other transmission time

FIG. 6a

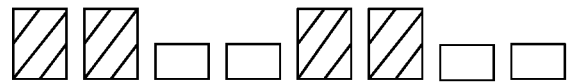

Time units included in first transmission time

Time units included in other transmission time

FIG. 6b

Time units included in first transmission time

Time units included in other transmission time

FIG. 6c

Time units included in first transmission duration

Time units included in other transmission time

FIG. 6d

DATA TRANSMISSION METHOD, APPARATUS, AND SYSTEM

CROSS-REFERENCE TO RELATED APPLICATIONS

This application a continuation of International Application No. PCT/CN2020/092720, filed on May 27, 2020, which claims priority to Chinese Patent Application No. 201910472678.2, filed on May 31, 2019. The disclosures of the aforementioned applications are hereby incorporated by reference in their entireties.

TECHNICAL FIELD

This application relates to the communication field, and in particular, to a data transmission method, an apparatus, and a system.

BACKGROUND

In a wireless communication system, for some deep-coverage scenarios (such as a cell edge or a basement), a path loss of wireless signal propagation is very severe. In this case, a cell coverage capability needs to be enhanced, to improve transmission performance. Particularly, for uplink transmission, because a transmit power of a terminal device is usually relatively low, when a signal sent by the terminal device arrives at a base station, the signal is generally very weak. As a result, it is difficult for the base station to correctly receive the signal sent by the terminal device. Therefore, it is particularly important to perform coverage enhancement in the deep-coverage scenario.

Currently, the terminal device enhances the cell coverage capability in a manner of "a relatively large quantity of repetitions and a relatively low power". For example, in a new radio (NR) communication system, a base station may configure a terminal device to repeatedly send a physical uplink shared channel (PUSCH) in N consecutive slots, and the base station combines and detects data carried on the PUSCH repeatedly sent by the terminal device, to improve data demodulation performance of the base station, thereby improving the cell coverage capability. A transmit power used by the terminal device to repeatedly send the PUSCH in each of the N slots does not exceed a maximum power value specified in a standard, where the maximum power value specified in the standard is determined based on a maximum power value specified in a law or regulation.

However, in an actual wireless communication environment, in a channel condition of a time-varying channel and frequency selective fading, an ideal effect cannot be achieved when the base station combines and detects the signals. Therefore, to ensure that the transmit power of the terminal device falls within a maximum transmit power range, the terminal device usually repeatedly sends the PUSCH in the manner of "a relatively large quantity of repetitions and a relatively low power". In this case, transmission performance of the terminal device is relatively low.

SUMMARY

Embodiments of this application provide a data transmission method, an apparatus, and a system, to improve performance of demodulating uplink data when it is ensured that a transmit power of a terminal device within allocated transmission time does not exceed a maximum power value specified in a law or regulation.

To achieve the foregoing objective, the following technical solutions are used in the embodiments of this application.

According to a first aspect, a data transmission method and a corresponding apparatus are provided. In this solution, a terminal device determines first transmission time, and sends uplink data at a first power within the first transmission time. Second transmission time includes the first transmission time, the first transmission time includes N1 time units, the second transmission time includes N2 time units, N1 is a positive integer, and N2 is a positive integer greater than N1. Based on this solution, the terminal device sends the uplink data only within a part of transmission time included in the second transmission time and does not send the uplink data within other transmission time of the second transmission time, and is allowed to send the uplink data at a power greater than a second maximum power within the part of transmission time. Therefore, sending time of the terminal device is reduced, and a transmit power within short time is improved, so that demodulation performance of a network device on the uplink data can be improved, and it can be ensured that the transmit power of the terminal device within the second transmission time configured, scheduled, or indicated by the network device does not exceed a maximum power value specified in a law or regulation.

In a possible design, a transmit power of the terminal device in the N2 time units included in the second transmission time does not exceed the maximum power value specified in the law or regulation.

In a possible design, that a terminal device determines first transmission time includes: The terminal device determines the first transmission time based on at least one of indication information and the second transmission time, where the indication information indicates at least one of the following: a quantity N1 of time units included in the first transmission time and positions of the N1 time units included in the first transmission time.

In a possible design, the indication information includes first indication information, the first indication information is used to determine the quantity N1 of time units included in the first transmission time, and the first indication information indicates at least one of the following information: the quantity of time units included in the first transmission time; a ratio of the quantity of time units included in the first transmission time to a quantity of time units included in the second transmission time; and a ratio of the quantity of time units included in the first transmission time to a quantity of time units included in transmission time other than the first transmission time in the second transmission time.

In a possible design, the indication information includes second indication information, the second indication information is used to determine the positions of the N1 time units included in the first transmission time, and the second indication information indicates at least one of the following information: a distribution manner of the N1 time units included in the first transmission time; and an offset between the $1^{st}$ time unit of the first transmission time and the $1^{st}$ time unit of the second transmission time.

In a possible design, that the terminal device determines the first transmission time based on at least one of indication information and the second transmission time includes: The terminal device determines the first transmission time based on the second transmission time and based on predefined information about the quantity of time units included in the first transmission time, a predefined distribution manner of the N1 time units included in the first transmission time, and a predefined offset between the 1$^{st}$ time unit of the first transmission time and the 1$^{st}$ time unit included in the second transmission time.

In a possible design, the distribution manner of the N1 time units included in the first transmission time is a distributed manner or a centralized manner. That the distribution manner of the N1 time units included in the first transmission time is a distributed manner includes: every X time units in the second transmission time include Y time units in the first transmission time, where X is a positive integer greater than Y and less than or equal to N2, and Y is a positive integer less than or equal to N1. Alternatively, that the distribution manner of the N1 time units included in the first transmission time is a centralized manner includes: the N1 time units included in the first transmission time are N1 consecutive time units in the N2 time units of the second transmission time. Based on this solution, on one hand, when the distribution manner of the N1 time units included in the first transmission time is the distributed manner, a diversity gain in time domain can be obtained, and a case in which the data is in deep fading in an entire process in which the terminal device sends the data can be avoided. On the other hand, when the distribution manner of the N1 time units included in the first transmission time is the centralized manner, the network device can perform energy combination before signal demodulation, so that the demodulation performance of the network device can be improved. This is more applicable to a case in which a channel changes relatively slowly.

In a possible design, a first maximum power is determined based on the second maximum power and a power offset value.

In a possible design, the first maximum power, the second maximum power, and the power offset value satisfy the following formula: $P_{CMAX,f,c(i)}'=P_{CMAX,f,c(i)}+P_{offset}$ [dBm], where $P_{CMAX,f,c(i)}'$ is the first maximum power, $P_{CMAX,f,c(i)}$ is the second maximum power, and $P_{offset}$ is the power offset value.

In a possible design, the first maximum power, the second maximum power, and the power offset value satisfy the following formula: $P_{CMAX,f,c(i)}'=\min\{P_{CMAX,f,c(i)}+P_{offset}, \overline{P_{CMAX,f,c(i)}}\}$ [dBm], where $P_{CMAX,f,c(i)}'$ is the first maximum power, $P_{CMAX,f,c(i)}$ is the second maximum power, $P_{offset}$ is the power offset value, $\overline{P_{CMAX,f,c(i)}}$ is a predefined third maximum power, and $\min\{x,y\}$ represents a smaller value in x and y. Based on this solution, when the terminal device determines the first maximum power according to the formula, if the power offset value is relatively large, resulting in a sum of the second maximum power and the power offset value is greater than the predefined third maximum power, the terminal device uses the predefined third maximum power as the first maximum power, so that an adverse impact caused by the excessively great first maximum power, for example, signal distortion caused by a transmit power that exceeds a linear area of a power amplifier module, can be avoided.

In a possible design, the power offset value is determined based on N1 and N2.

In a possible design, N1 and N2 satisfy the following formula:

$$P_{offset} = 10 \cdot \log_{10} \frac{N2}{N1} [dB],$$

where $P_{offset}$ is the power offset value.

According to a second aspect, a data transmission method and a corresponding apparatus are provided. In this solution, a network device determines first transmission time, and receives uplink data within the first transmission time. Second transmission time includes the first transmission time, the first transmission time includes N1 time units, the second transmission time includes N2 time units, N1 is a positive integer, and N2 is a positive integer greater than N1. For a technical effect brought by the second aspect, refer to the technical effect brought by the first aspect. Details are not described herein again.

In a possible design, before the network device receives the uplink data, the data transmission method provided in this embodiment of this application further includes: The network device sends indication information to a terminal device, where the indication information indicates at least one of the following: a quantity N1 of time units included in the first transmission time and positions of the N1 time units included in the first transmission time.

In a possible design, the indication information includes first indication information, the first indication information is used to determine the quantity N1 of time units included in the first transmission time, and the first indication information indicates at least one of the following information: the quantity of time units included in the first transmission time; a ratio of the quantity of time units included in the first transmission time to a quantity of time units included in the second transmission time; and a ratio of the quantity of time units included in the first transmission time to a quantity of time units included in transmission time other than the first transmission time in the second transmission time.

In a possible design, the indication information includes second indication information, the second indication information is used to determine the positions of the N1 time units included in the first transmission time, and the second indication information indicates at least one of the following information: a distribution manner of the N1 time units included in the first transmission time; and an offset between the 1$^{st}$ time unit of the first transmission time and the 1$^{st}$ time unit of the second transmission time.

In a possible design, the distribution manner of the N1 time units included in the first transmission time is a distributed manner or a centralized manner. That the distribution manner of the N1 time units included in the first transmission time is a distributed manner includes: every X time units in the second transmission time include Y time units in the first transmission time, where X is a positive integer greater than Y and less than or equal to N2, and Y is a positive integer less than or equal to N1. Alternatively, that the distribution manner of the N1 time units included in the first transmission time is a centralized manner includes: the N1 time units included in the first transmission time are N1 consecutive time units in the N2 time units of the second transmission time. Based on this solution, on one hand, when the distribution manner of the N1 time units included in the first transmission time is the distributed manner, a diversity gain in time domain can be obtained, and a case in which the data is in deep fading in an entire process in which the terminal device sends the data can be avoided. On the other hand, when the distribution manner of the N1 time units included in the first transmission time is the centralized manner, the network device can perform energy combination before signal demodulation, so that the demodulation performance of the network device can be improved. This is more applicable to a case in which a channel changes relatively slowly.

According to a third aspect, a communication apparatus is provided, to implement the foregoing methods. The communication apparatus may be the terminal device in the first aspect, or an apparatus including the terminal device. Alternatively, the communication apparatus may be the network device in the second aspect, or an apparatus including the network device. The communication apparatus includes a module, a unit, or a means (means) for implementing the methods. The module, the unit, or the means may be implemented by hardware or software, or may be implemented by hardware executing corresponding software. The hardware or the software includes one or more modules or units corresponding to the foregoing function.

According to a fourth aspect, a communication apparatus is provided, and includes a processor and a memory, where the memory is configured to store computer instructions; and when the processor executes the instructions, the communication apparatus is enabled to perform the method in any one of the foregoing aspects. The communication apparatus may be the terminal device in the first aspect, or an apparatus including the terminal device. Alternatively, the communication apparatus may be the network device in the second aspect, or an apparatus including the network device.

According to a fifth aspect, a communication apparatus is provided, and includes a processor, where the processor is configured to: couple to a memory; and after reading instructions in the memory, perform the method in any one of the foregoing aspects according to the instructions. The communication apparatus may be the terminal device in the first aspect, or an apparatus including the terminal device. Alternatively, the communication apparatus may be the network device in the second aspect, or an apparatus including the network device.

According to a sixth aspect, a computer-readable storage medium is provided. The computer-readable storage medium stores instructions. When the instructions are run on a communication apparatus, a computer is enabled to perform the method according to any one of the foregoing aspects.

According to a seventh aspect, a computer program product including instructions is provided. When the computer program product runs on a communication apparatus, a computer is enabled to perform the method according to any one of the foregoing aspects.

According to an eighth aspect, a communication apparatus (for example, the communication apparatus may be a chip or a chip system) is provided, and includes a processor, configured to implement the function in any one of the foregoing aspects. In a possible design, the communication apparatus further includes a memory, where the memory is configured to store necessary program instructions and data. When the communication apparatus is the chip system, the communication apparatus may include a chip, or may include a chip and another discrete component.

For technical effects brought by any design manner in the third aspect to the eighth aspect, refer to technical effects brought by different design manners in the first aspect or the second aspect. Details are not described herein again.

According to a ninth aspect, a communication system is provided, where the communication system includes the terminal device in the foregoing aspects and the network device in the foregoing aspects.

BRIEF DESCRIPTION OF DRAWINGS

FIG. 6a is a schematic diagram 1 of discrete distribution of time units included in first transmission time according to an embodiment of this application;

FIG. 6b is a schematic diagram 2 of discrete distribution of time units included in first transmission time according to an embodiment of this application;

FIG. 6c is a schematic diagram 3 of discrete distribution of time units included in first transmission time according to an embodiment of this application;

FIG. 6d is a schematic diagram 4 of discrete distribution of time units included in first transmission time according to an embodiment of this application;

DESCRIPTION OF EMBODIMENTS

Figure 1:
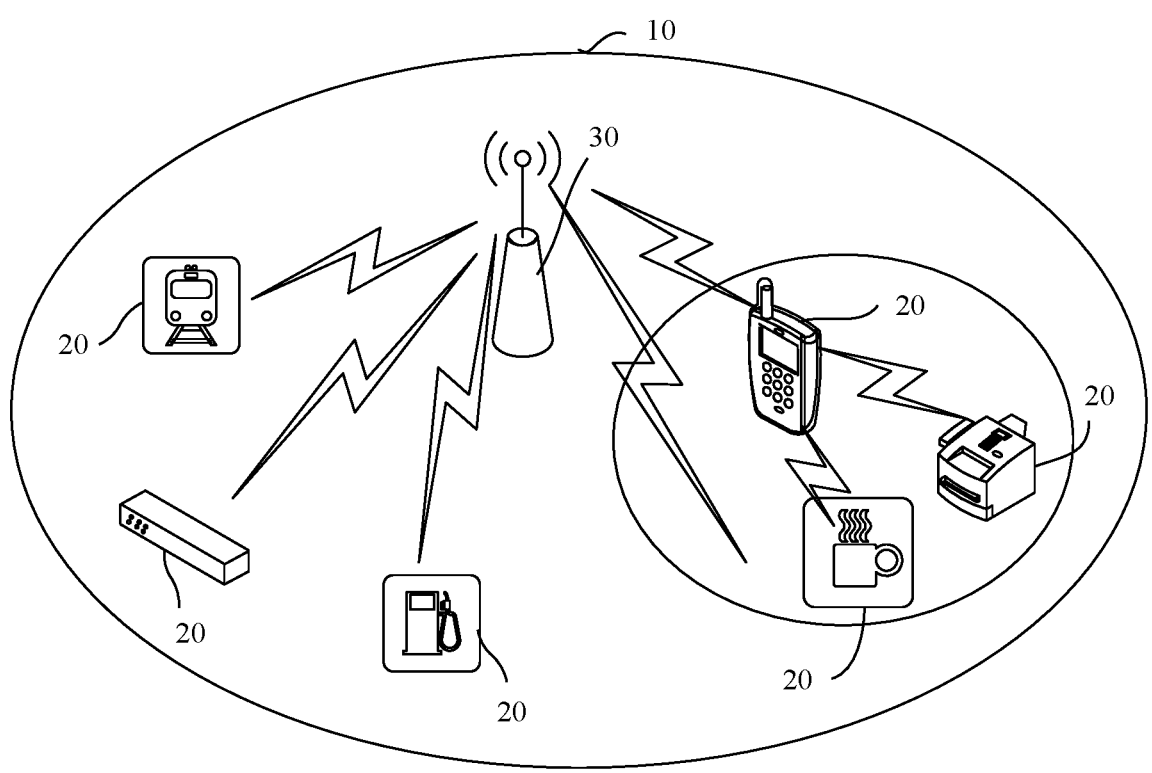
FIG. 1 is a schematic diagram of a structure of a communication system according to an embodiment of this application.

The following describes the technical solutions in the embodiments of this application with reference to the accompanying drawings in the embodiments of this application. In descriptions of this application, "/" represents an "or" relationship between associated objects unless otherwise specified. For example, A/B may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, and c may mean: a, b, c, a-b, a-c, b-c, or a-b-c, where a, b, and c may be singular or plural. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

The technical solutions in the embodiments of this application may be applied to various communication systems, such as an orthogonal frequency division multiple access (OFDMA) system, a single-carrier frequency division multiple access (single carrier FDMA, SC-FDMA) system, and another system. The terms "system" and "network" may be interchanged. A radio technology such as evolved universal terrestrial radio access (E-UTRA) or ultra mobile broadband (UMB) may be implemented in an OFDMA system. E-UTRA is an evolved version of a universal mobile telecommunications (UMTS) system. The 3rd generation partnership project (3GPP for short) uses a new version of E-UTRA in long term evolution (LTE for short) and various versions evolved based on LTE. A 5th generation (5G) communication system is a next-generation communication system under research. The 5G communication system includes a 5G non-standalone (non-standalone, NSA) mobile communication system, a 5G standalone (standalone, SA) mobile communication system, or both a 5G NSA mobile communication system and a 5G SA mobile communication system. In addition, the communication systems are also applicable to a future-oriented communication technology, and are applicable to the technical solutions provided in the embodiments of this application. The foregoing communication systems applicable to this application are merely examples for description, and a communication system applicable to this application is not limited thereto. A general description is provided herein, and details are not described below again.

FIG. 1 shows a communication system 10 according to an embodiment of this application. The communication system 10 includes a network device 30 and a plurality of terminal devices 20 connected to the network device 30. Optionally, the different terminal devices 20 may communicate with each other.

For example, the network device 30 shown in FIG. 1 interacts with the terminal device 20. In this embodiment of this application, in a possible implementation, the terminal device 20 determines first transmission time. Second transmission time includes the first transmission time, the first transmission time includes N1 time units, the second transmission time includes N2 time units, N1 is a positive integer, and N2 is a positive integer greater than N1. The terminal device 20 sends uplink data to the network device 30 at a first power within the first transmission time. The first power does not exceed a first maximum power, the first maximum power is greater than a second maximum power, and the second maximum power is a corresponding maximum power for sending the uplink data within the second transmission time. Based on this solution, the terminal device sends the uplink data only within a part of transmission time in the second transmission time, and is allowed to send the uplink data at a power greater than the second maximum power within the part of transmission time. Therefore, sending time of the terminal device is reduced, and a transmit power within short time is improved, so that the terminal device can improve performance of demodulating the uplink data when it is ensured that the transmit power within the allocated transmission time does not exceed a maximum power value specified in a law or regulation.

Optionally, the network device 30 in this embodiment of this application is a device that enables the terminal device 20 to access a wireless network, and may be an evolved NodeB (eNB or eNodeB) in LTE, a base station in a 5G network or a future evolved public land mobile network (PLMN), a broadband network gateway (BNG), an aggregation switch, a non-3rd generation partnership project (3GPP) access device, or the like. This is not specifically limited in this embodiment of this application. Optionally, the base station in this embodiment of this application may include different forms of base stations such as a macro base station, a micro base station (which is also referred to as a small cell), a relay station, or an access point. This is not specifically limited in this embodiment of this application.

Optionally, the terminal device 20 in this embodiment of this application may be a device configured to implement a wireless communication function, for example, a terminal or a chip that can be used in a terminal. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol SIP) phone, a wireless local loop (wireless local loop, WLL) station, a personal digital assistant (PDA), a handheld device or a computing device having a wireless communication function, another processing device connected to a wireless modem, a vehicle-mounted device, a wearable device, a virtual reality (VR) terminal device, an augmented reality AR) terminal device, a wireless terminal in industrial control, a wireless terminal in self driving (self driving), a wireless terminal in remote medical, a wireless terminal in a smart grid (smart grid), a wireless terminal in transportation safety, a wireless terminal in a smart city, a wireless terminal in a smart home, or the like. The terminal may be movable or fixed.

Optionally, the network device 30 and the terminal device 20 in this embodiment of this application may also be referred to as communication apparatuses, and each may be a general-purpose device or a dedicated device. This is not specifically limited in this embodiment of this application.

Figure 2:
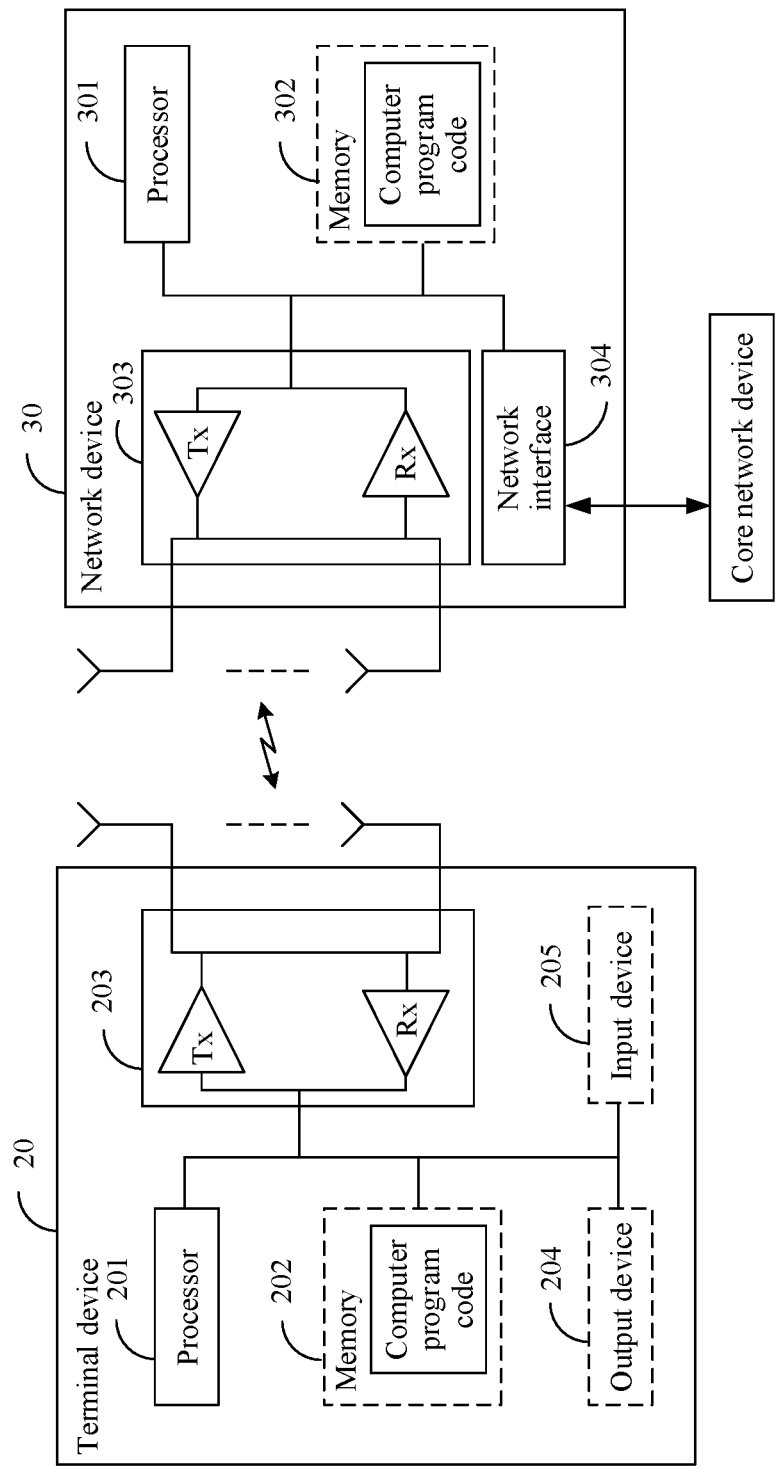
FIG. 2 is a schematic diagram of a structure of a terminal device and a structure of a network device according to an embodiment of this application.

Optionally, FIG. 2 is a schematic diagram of a structure of a network device 30 and a structure of a terminal device 20 according to an embodiment of this application.

The terminal device 20 includes at least one processor (in FIG. 2, one processor 201 is included as an example for description) and at least one transceiver (in FIG. 2, one transceiver 203 is included as an example for description). Optionally, the terminal device 20 may further include at least one memory (in FIG. 2, one memory 202 is included as an example for description), at least one output device (in FIG. 2, one output device 204 is included as an example for description), and at least one input device (in FIG. 2, one input device 205 is included as an example for description).

The processor 201, the memory 202, and the transceiver 203 are connected through a communication line. The communication line may include a path for transmitting information between the foregoing components.

The processor 201 may be a general-purpose central processing unit (CPU), a microprocessor, an application-specific integrated circuit ASIC), or one or more integrated circuits configured to control program execution of the solutions provided in this application. In a specific implementation, in an embodiment, the processor 201 may also include a plurality of CPUs, and the processor 201 may be a single-core (single-CPU) processor or a multi-core (multi-CPU) processor. The processor herein may be one or more devices, circuits, and/or processing cores configured to process data (for example, a computer program instruction).

The memory 202 may be an apparatus that has a storage function. For example, the memory 202 may be a read-only memory (ROM) or another type of static storage device that can store static information and instructions; or a random access memory (RAM) or another type of dynamic storage device that can store information and instructions; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto. The memory 202 may exist independently, and is connected to the processor 201 by using the communication line. Alternatively, the memory 202 may be integrated with the processor 201.

The memory 202 is configured to store computer-executable instructions for executing the solutions of this application, and the processor 201 controls the execution. Specifically, the processor 201 is configured to execute the computer-executable instructions stored in the memory 202, to implement the data transmission method according to the embodiments of this application. Optionally, the computer-executable instructions in this embodiment of this application may also be referred to as application program code or computer program code. This is not specifically limited in this embodiment of this application.

The transceiver 203 may be any apparatus such as a transceiver, and is configured to communicate with another device or a communication network such as an Ethernet, a radio access network (RAN), or a wireless local area network (WLAN). The transceiver 203 includes a transmitter (Tx) and a receiver (Rx).

The output device 204 communicates with the processor 201, and may display information in a plurality of manners. For example, the output device 204 may be a liquid crystal display LCD), a light emitting diode (LED) display device, a cathode ray tube (CRT) display device, or a projector.

The input device 205 communicates with the processor 201, and may receive user input in a plurality of manners. For example, the input device 205 may be a mouse, a keyboard, a touchscreen device, or a sensing device.

The network device 30 includes at least one processor (in FIG. 2, one processor 301 is included as an example for description), at least one transceiver (in FIG. 2, one transceiver 303 is included as an example for description), and at least one network interface (in FIG. 2, one network interface 304 is included as an example for description). Optionally, the network device 30 may further include at least one memory (in FIG. 2, one processor 302 is included as an example for description). The processor 301, the memory 302, the transceiver 303, and the network interface 304 are connected through a communication line. The network interface 304 is configured to connect to a core network device through a link (for example, an S1 interface), or connect to a network interface of another network device through a wired or wireless link (for example, an X2 interface) (not shown in FIG. 2). This is not specifically limited in this embodiment of this application. In addition, for descriptions of the processor 301, the memory 302, and the transceiver 303, refer to descriptions of the processor 201, the memory 202, and the transceiver 203 in the terminal device 20. Details are not described herein again.

Figure 3:
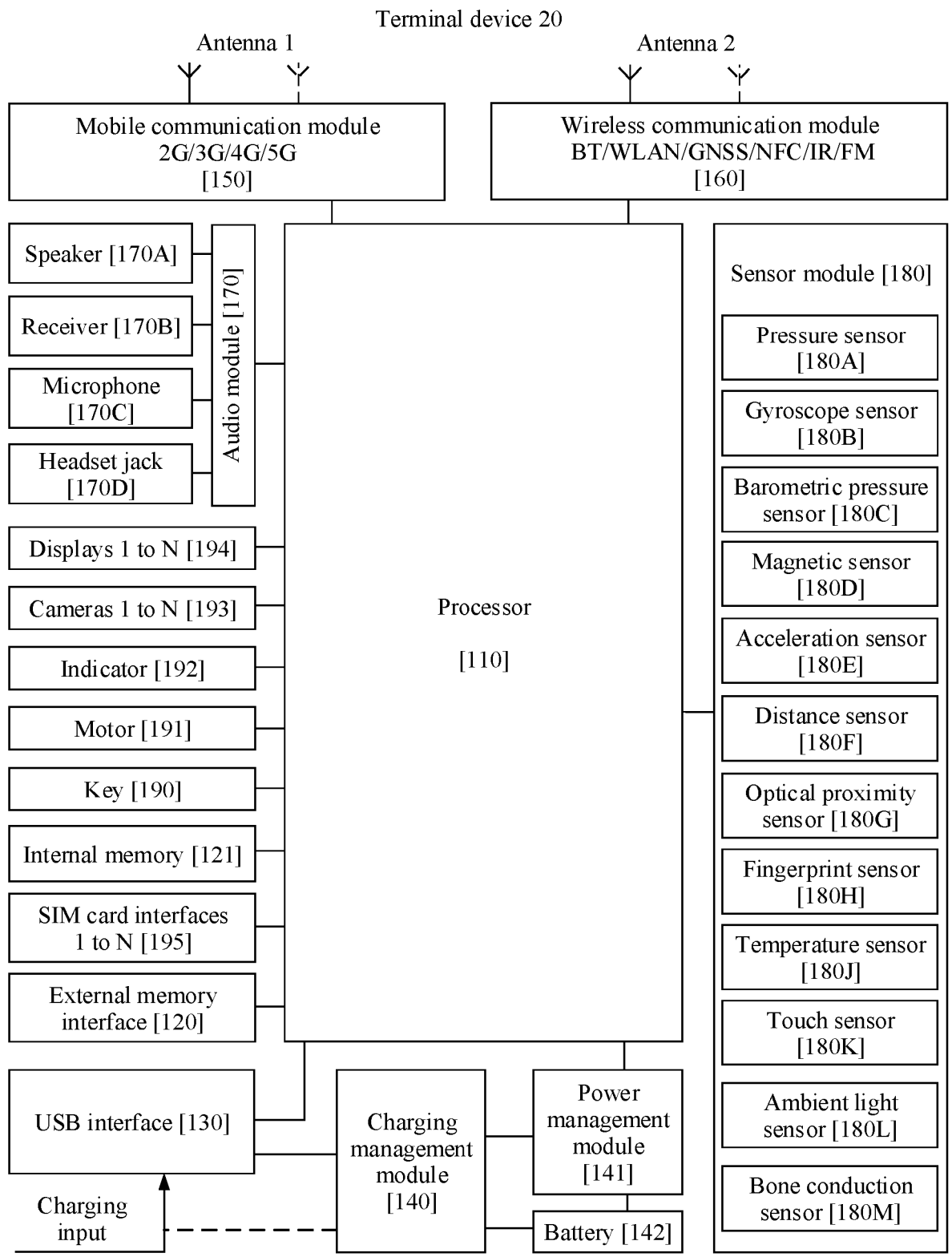
FIG. 3 is another schematic diagram of a structure of a terminal device according to an embodiment of this application.

With reference to the schematic diagram of the structure of the terminal device 20 shown in FIG. 2, for example, FIG. 3 shows a specific form of the structure of the terminal device 20 according to an embodiment of this application.

In some embodiments, a function of the processor 201 in FIG. 2 may be implemented by using a processor 110 in FIG. 3.

In some embodiments, a function of the transceiver 203 in FIG. 2 may be implemented by using an antenna 1, an antenna 2, a mobile communication module 150, a wireless communication module 160, and the like in FIG. 3.

The antenna 1 and the antenna 2 are configured to transmit and receive an electromagnetic wave signal. Each antenna in the terminal device 20 may be configured to cover one or more communication frequency bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a solution used for wireless communication that includes 2G, 3G, 4G, 5G, and the like and that is applied to the terminal device 20. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to a modem processor for demodulation. The mobile communication module 150 may further amplify a signal modulated by the modem processor, and convert the signal into an electromagnetic wave by using the antenna 1 for radiation. In some embodiments, at least a part of function modules of the mobile communication module 150 may be disposed in the processor 110. In some embodiments, at least a part of function modules of the mobile communication module 150 and at least a part of modules of the processor 110 may be disposed in a same device.

The wireless communication module 160 can provide a wireless communication solution used in the terminal device 20 and including wireless communication of a wireless local area network (wireless local area network, WLAN) (such as a Wi-Fi network), Bluetooth (Bluetooth, BT), a global navigation satellite system(global navigation satellite system, GNSS), frequency modulation (FM), near field communications (NFC), an infrared (IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation. When the terminal device 20 is a first device, that the wireless communication module 160 may provide an NFC wireless communication solution applied to the terminal device 20 means that the first device includes an NFC chip. The NFC chip can improve an NFC wireless communication function. When the terminal device 20 is a second device, that the wireless communication module 160 may provide an NFC wireless communication solution applied to the terminal device 20 means that the first device includes an electronic label (for example, a radio frequency identification (RFID) label). When approaching the electronic label, an NFC chip of another device may perform NFC wireless communication with the second device.

In some embodiments, the antenna 1 of the terminal device 20 is coupled to the mobile communication module 150, and the antenna 2 is coupled to the wireless communication module 160, so that the terminal device 20 can communicate with a network and another device by using a wireless communication technology. The wireless communication technology may include long term evolution (LTE), the BT, the GNSS, the WLAN, the NFC, the FM, the IR technology, or the like. The GNSS may include a global positioning system (GPS), a global navigation satellite system (GLONASS), a BeiDou navigation satellite system (BDS), a quasi-zenith satellite system (QZSS), or a satellite based augmentation system (SBAS).

In some embodiments, a function of the memory 202 in FIG. 2 may be implemented by using an internal memory 121, an external memory (for example, a Micro SD card) connected to an external memory interface 120 in FIG. 3, or the like.

In some embodiments, a function of the output device 204 in FIG. 2 may be implemented by using a display screen 194 in FIG. 3. The display screen 194 is configured to display an image, a video, and the like. The display 194 includes a display panel.

In some embodiments, a function of the input device 205 in FIG. 2 may be implemented by using a mouse, a keyboard, a touchscreen device, or a sensor module 180 in FIG. 3. For example, as shown in FIG. 3, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not specifically limited in this embodiment of this application.

In some embodiments, as shown in FIG. 3, the terminal device 20 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "mike" or a "microphone"), a headset jack 170D, or the like. This is not specifically limited in this embodiment of this application.

It may be understood that the structure shown in FIG. 3 does not constitute a specific limitation on the terminal device 20. For example, in some other embodiments of this application, the terminal device 20 may include more or fewer components than those shown in the figure, or some components may be combined, or some components may be split, or the components may be differently arranged. The components shown in the figure may be implemented by using hardware, software, or a combination of software and hardware.

Currently, when a terminal device enhances a cell coverage capability in a manner of "a relatively large quantity of repetitions and a relatively low power", because a transmit power used to repeatedly send uplink data in each of N slots does not exceed a maximum power value specified in a standard, within a time period of the N consecutive slots, a transmit power of the terminal device still does not exceed a maximum power value specified in a law or regulation. However, to improve transmission performance, if the terminal device is allowed to repeatedly send the uplink data in a manner of "a relatively small quantity of repetitions and a relatively high power", that is, a base station decreases a quantity of slots allocated to the terminal device for repeatedly transmitting the uplink data (that is, decreases a value of N), and improves the maximum power value that is allowed to be used by the terminal device to repeatedly send the uplink data in each slot, within the time period of the N consecutive slots, the transmit power of the terminal device may exceed the maximum power value specified in the law or regulation. Therefore, within time of all slots allocated by the base station to the terminal device, in an existing standard, it cannot be ensured that the transmit power of the terminal device does not exceed the maximum power value specified in the law or regulation.

Based on this, the embodiments of this application provide a data transmission method. In the data transmission method, a terminal device determines first transmission time, and sends uplink data at a first power within the first transmission time. Second transmission time includes the first transmission time, the first transmission time includes N1 time units, the second transmission time includes N2 time units, N1 is a positive integer, and N2 is a positive integer greater than N1. The first power does not exceed a first maximum power, the first maximum power is greater than a second maximum power, and the second maximum power is a corresponding maximum power for sending the uplink data within the second transmission time. Based on this solution, the terminal device sends the uplink data only within a part of transmission time in the second transmission time, and is allowed to send the uplink data at a power greater than the second maximum power within the part of transmission time. Therefore, sending time of the terminal device is reduced, and a transmit power within short time is improved, so that the terminal device can improve performance of demodulating the uplink data when it is ensured that the transmit power within the allocated transmission time does not exceed a maximum power value specified in a law or regulation.

With reference to FIG. 1 to FIG. 3, the following describes in detail the data transmission method provided in the embodiments of this application by using specific embodiments.

It should be noted that in the following embodiments of this application, names of messages between network elements, names of parameters in messages, or the like are merely examples, and there may be other names during specific implementation. This is not specifically limited in the embodiments of this application.

It should be noted that a "time unit" in the following embodiments of this application may be a slot, or may be another quantity representing time, for example, a frame, a subframe, a half slot, a half subframe, an orthogonal frequency division multiplexing OFDM), or an OFDM symbol group including a plurality of consecutive OFDM symbols. This is not specifically limited in the embodiments of this application, and is uniformly described herein. Details are not described in the following embodiments again.

It should be noted that "sending uplink data" in the following embodiments of this application may be understood as "sending a PUSCH", and the PUSCH may be a PUSCH corresponding to a transport block (TB), or may be a PUSCH corresponding to a plurality of TBs. Alternatively, the "sending uplink data" may be understood as "sending a physical uplink control channel PUCCH)", or the "sending uplink data" may be understood as "sending a PUSCH and a demodulation reference signal (DMRS)" or "sending a PUCCH and a DMRS". This is uniformly described herein. Details are not described in the following embodiments again.

Figure 4:
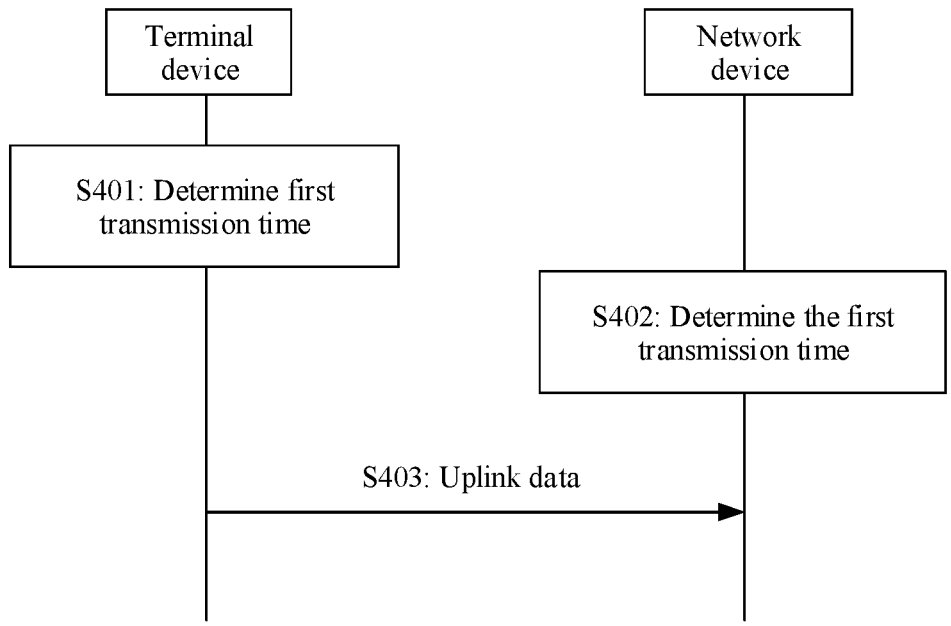
FIG. 4 is a schematic flowchart of a data transmission method according to an embodiment of this application.

In a possible implementation, FIG. 4 shows a data transmission method according to an embodiment of this application. The data transmission method includes the following steps.

S401: A terminal device determines first transmission time.

Second transmission time includes the first transmission time, the first transmission time includes N1 time units, the second transmission time includes N2 time units, N1 is a positive integer, and N2 is a positive integer greater than N1.

Optionally, in this embodiment of this application, the second transmission time may be time that is configured, scheduled, or indicated by a network device for/to the terminal device and that is used to repeatedly transmit uplink data. The network device may configure the second transmission time for the terminal device by using a higher-layer configuration, may indicate the second transmission time to the terminal device by using downlink control information (downlink control information, DCI), or may indicate the second transmission time to the terminal device in a manner in which a higher-layer configuration and DCI indication are combined. After determining a position of the second transmission time, the terminal device may determine the first transmission time in the second transmission time, that is, determine a quantity N1 of time units included in the first transmission time and positions of the N1 time units included in the first transmission time. It should be noted that when the transmission time is continuous time, the position of the transmission time may be understood as a start time point and duration of the transmission time. Alternatively, when the transmission time is intermittent time, the position of the transmission time may be understood as a start time point and duration of each period of time included in the transmission time.

Optionally, in this embodiment of this application, the terminal device may determine the first transmission time based on the second transmission time. Specifically, the terminal device may determine the first transmission time based on the second transmission time and based on predefined information about the quantity of time units included in the first transmission time, a predefined distribution manner of the N1 time units included in the first transmission time, and a predefined offset between the $1^{st}$ time unit of the first transmission time and the $1^{st}$ time unit of the second transmission time.

Figure 5A:
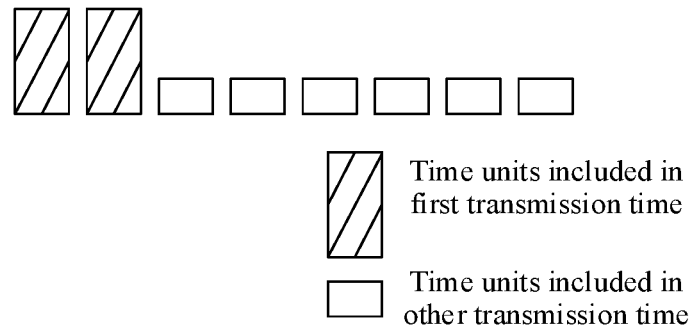
FIG. 5a is a schematic diagram 1 of information about a quantity of time units included in first transmission time according to an embodiment of this application.
Figure 5B:
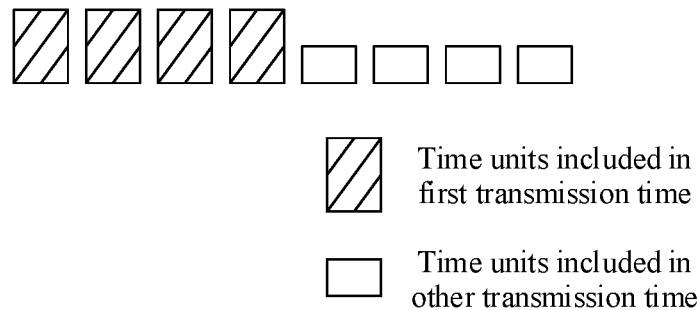
FIG. 5b is a schematic diagram 2 of information about a quantity of time units included in first transmission time according to an embodiment of this application.

The information about the quantity of time units included in the first transmission time may be at least one of the following: the quantity N1 of time units included in the first transmission time, a ratio of the quantity of time units included in the first transmission time to a quantity of time units included in the second transmission time, or a ratio of the quantity of time units included in the first transmission time to a quantity of time units included in transmission time other than the first transmission time in the second transmission time. For example, as shown in FIG. 5a, an example in which the second transmission time includes eight time units, and the first transmission time includes two time units is used. In this case, a quantity of time units included in the first transmission time is 2, a ratio of the quantity of time units included in the first transmission time to a quantity of time units included in the second transmission time is 1:4, and a ratio of the quantity of time units included in the first transmission time to a quantity of time units included in transmission time other than the first transmission time in the second transmission time is 1:3. Alternatively, as shown in FIG. 5b, an example in which the second transmission time includes eight time units, and the first transmission time includes four time units is used. In this case, a quantity of time units included in the first transmission time is 4, a ratio of the quantity of time units included in the first transmission time to a quantity of time units included in the second transmission time is 1:2, and a ratio of the quantity of time units included in the first transmission time to a quantity of time units included in transmission time other than the first transmission time in the second transmission time is 1:1.

The distribution manner of the N1 time units included in the first transmission time may be a distributed manner or a centralized manner.

Optionally, that the distribution manner of the N1 time units included in the first transmission time is the distributed manner may be that every X time units in the second transmission time include Y time units in the first transmission time, where X is a positive integer greater than Y and less than or equal to N2, and Y is a positive integer less than or equal to N1. This distribution manner helps obtain a diversity gain in time domain, and can avoid a case in which the data is in deep fading in an entire process in which the terminal device sends the data.

For example, the second transmission time includes eight time units, the first transmission time includes four time units, and a distribution manner of the four time units included in the first transmission time is a distributed manner in which every four time units include two time units of the first transmission time. As shown in FIG. 6a, the two time units that are of the first transmission time and that are included in every four time units of the second transmission time may be not adjacent. In this case, it may alternatively be understood that every two time units of the second transmission time include one time unit of the first transmission time. Alternatively, as shown in FIG. 6b, the two time units that are of the first transmission time and that are included in every four time units of the second transmission time may be the first two of the four time units. Alternatively, as shown in FIG. 6c, the two time units that are of the first transmission time and that are included in every four time units of the second transmission time may be two time units in the middle of the four time units. As shown in FIG. 6d, the two time units that are of the first transmission time and that are included in every four time units of the second transmission time may be the last two of the four time units. Optionally, during actual application, the predefined distribution manner of the N1 time units included in the first transmission time may be one of a plurality of possible discrete distribution manners, that is, distribution of the N1 time units included in the first transmission time may be uniquely determined in a predefined distribution manner.

Optionally, that the distribution manner of the N1 time units included in the first transmission time is the centralized manner may be that the N1 time units included in the first transmission time are N1 consecutive time units in the N2 time units of the second transmission time. This distribution manner helps the network device perform energy combination before signal demodulation, so that demodulation performance of the network device can be improved. This is more applicable to a case in which a channel changes relatively slowly.

Figure 7:
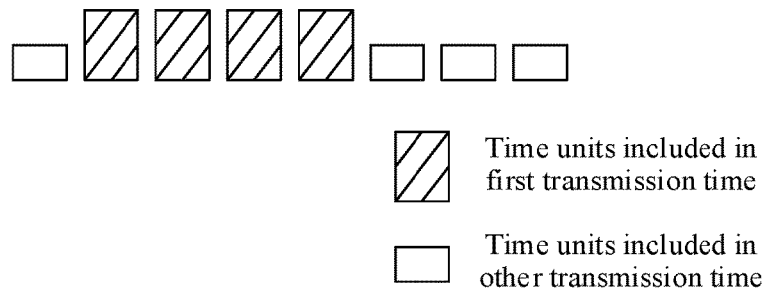
FIG. 7 is a schematic diagram of centralized distribution of time units included in first transmission time according to an embodiment of this application.

For example, the second transmission time includes eight time units, the first transmission time includes four time units, and a distribution manner of the four time units included in the first transmission time is the centralized manner. Distribution of the four time units included in the first transmission time may be shown in FIG. 7.

An offset between the $1^{st}$ time unit of the first transmission time and the $1^{st}$ time unit of the second transmission time may be used to determine a start position of the first transmission time. A unit of the offset may be the time unit described in this embodiment of this application. For example, in the foregoing examples in FIG. 5a, FIG. 5b, FIG. 6a, and FIG. 6b, the offset between the $1^{st}$ time unit of the first transmission time and the $1^{st}$ time unit of the second transmission time may be considered as zero. In the examples in FIG. 6c and FIG. 7, the offset between the $1^{st}$ time unit of the first transmission time and the $1^{st}$ time unit of the second transmission time may be considered as one. In the example in FIG. 6d, the offset between the $1^{st}$ time unit of the first transmission time and the $1^{st}$ time unit of the second transmission time may be considered as two.

Figure 8:
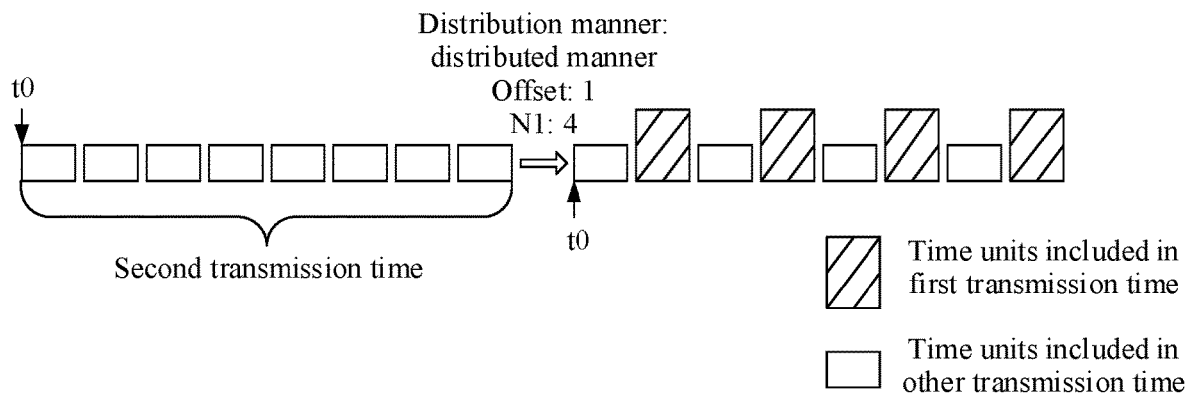
FIG. 8 is a schematic diagram 1 of determining first transmission time by a terminal device according to an embodiment of this application.

Optionally, the terminal device may determine the first transmission time based on the position of the second transmission time and based on the predefined information about the quantity of time units included in the first transmission time, the predefined distribution manner of the N1 time units included in the first transmission time, and the predefined offset between the $1^{st}$ time unit of the first transmission time and the $1^{st}$ time unit of the second transmission time. For example, it is assumed that the second transmission time includes eight time units, the predefined information about the quantity of time units included in the first transmission time indicates that the quantity N1 of time units included in the first transmission time is four, the predefined distribution manner of the four time units included in the first transmission time is that every four time units of the second transmission time include two time units of the first transmission time and the two time units are not adjacent, and the predefined offset between the $1^{st}$ time unit of the first transmission time and the $1^{st}$ time unit of the second transmission time is one. As shown in FIG. 8, the terminal device may determine, based on the foregoing information, that the first transmission time is that the uplink data is sent in the second time unit, the fourth time unit, the sixth time unit, and the eighth time unit that start from a moment t0. It should be noted that the predefined three types of information may alternatively be other values. This is not specifically limited in this embodiment of this application.

Optionally, in this embodiment of this application, because the terminal device sends the uplink data within a part of transmission time, configured by the network device for the terminal device, in the second transmission time, the network device also needs to perform the following step S402 to determine the first transmission time for receiving the uplink data from the terminal device.

S402: The network device determines the first transmission time.

The second transmission time includes the first transmission time, the first transmission time includes the N1 time units, the second transmission time includes the N2 time units, N1 is a positive integer, and N2 is a positive integer greater than N1.

Optionally, when the network device has determined the second transmission time, the network device may determine the first transmission time based on the second transmission time and the predefined information. The predefined information includes the information about the quantity of time units included in the first transmission time, the distribution manner of the N1 time units included in the first transmission time, and the offset between the $1^{st}$ time unit of the first transmission time and the $1^{st}$ time unit of the second transmission time. For a related description, refer to the description that the terminal device determines the first transmission time based on the second transmission time and the predefined information in step S401. Details are not described herein again. Alternatively, the network device may first directly determine the first transmission time, determine the second transmission time based on the first transmission time and the predefined information, and then indicate the second transmission time to the terminal device, so that the terminal device determines the first transmission time based on the second transmission time and the predefined information.

S403: The terminal device sends the uplink data at a first power within the first transmission time. Correspondingly, the network device receives the uplink data within the first transmission time.

The first power does not exceed a first maximum power, the first maximum power is greater than a second maximum power, and the second maximum power is a corresponding maximum power for sending the uplink data within the second transmission time. That is, a maximum power specified in a standard is $P_{CMAX,f,c(i)}$, where c represents a cell, f represents a carrier, and i represents a transmission time unit. In this case, $P_{CMAX,f,c(i)}$ represents a maximum power allowed for transmitting the uplink data in the $i^{th}$ transmission time unit of the carrier f in the cell c.

Optionally, after determining the first maximum power, the terminal device may send the uplink data, at the first power that does not exceed the first maximum power, within the first transmission time.

Optionally, the terminal device may determine the first maximum power based on the second maximum power and a power offset value. The power offset value represents an upper limit value of a power allowed to be increased within the first transmission time.

Optionally, in a possible implementation, that the terminal device determines the first maximum power based on the second maximum power and the power offset value includes: The terminal device determines the first maximum power according to the following formula (1):

$$P_{CMAX,f,c(i)}' = P_{CMAX,f,c(i)} + P_{offset} \text{ [dBm]} \quad (1)$$

$P_{CMAX,f,c(i)}'$ is the first maximum power, $P_{CMAX,f,c(i)}$ is the second maximum power, and $P_{offset}$ is the power offset value. Optionally, the power offset value may be determined based on the quantity N1 of time units included in the first transmission time and the quantity N2 of time units included in the second transmission time. Specifically, the power offset value may be determined according to the following formula (3):

$$P_{offset} = 10 \cdot \log_{10} \frac{N2}{N1} [dB] \quad (3)$$

Alternatively, the network device may indicate the power offset value to the terminal device, to reduce complexity of calculating the first maximum power by the terminal device.

Optionally, in another possible implementation, that the terminal device determines the first maximum power based on the second maximum power and the power offset value includes: The terminal device determines the first maximum power according to the following formula (2):

$$P_{CMAX,f,c(i)}' = \min\{P_{CMAX,f,c(i)} + P_{offset}, \overline{P_{CMAX,f,c(i)}}\} \text{ [dBm]} \quad (2)$$

$P_{CMAX,f,c(i)}'$ is the first maximum power, $P_{CMAX,f,c(i)}$ is the second maximum power, $P_{offset}$ is the power offset value, $\overline{P_{CMAX,f,c(i)}}$ is a predefined third maximum power, and $\min\{x, y\}$ represents a smaller value in x and y. A method for determining the power offset value is similar to the foregoing implementation, and details are not described herein again.

When the terminal device determines the first maximum power according to the formula (2), if the power offset value is relatively large, resulting in a sum of the second maximum power and the power offset value is greater than the predefined third maximum power, the terminal device uses the predefined third maximum power as the first maximum power, so that an adverse impact caused by the excessively great first maximum power, for example, signal distortion caused by a transmit power that exceeds a linear area of a power amplifier module, can be avoided.

It should be noted that for a case in which the network device schedules uplink transmission of the terminal device by using DCI, step S402 is usually performed first, and then step S401 is performed. For a case in which the terminal device performs configured grant uplink transmission or grant free uplink transmission, step S401 and step S402 are not performed in a strict sequence. Step S401 may be first performed, and then step S402 is performed. Alternatively, step S402 may be first performed, and then step S401 is performed. Alternatively, step S401 and step S402 may be simultaneously performed. This is not specifically limited in this embodiment of this application.

According to the data transmission method provided in this embodiment of this application, the terminal device sends the uplink data only within the first transmission time included in the second transmission time and does not send the uplink data within other transmission time in the second transmission time, and is allowed to send the uplink data at a power greater than the second maximum power within the part of transmission time. Therefore, sending time of the terminal device is reduced, and a transmit power within short time is improved, so that the terminal device can improve performance of demodulating the uplink data when it is ensured that the transmit power within the allocated transmission time does not exceed a maximum power value specified in a law or regulation.

The processor 301 in the network device 30 shown in FIG. 2 may invoke application program code stored in the memory 302, to indicate the network device to perform actions performed by the network device in steps S401 to S403. The processor 201 in the terminal device 20 shown in FIG. 2 may invoke application program code stored in the memory 202, to indicate the terminal device to perform actions performed by the terminal device in steps S401 to S403. This is not limited in this embodiment.

Figure 9:
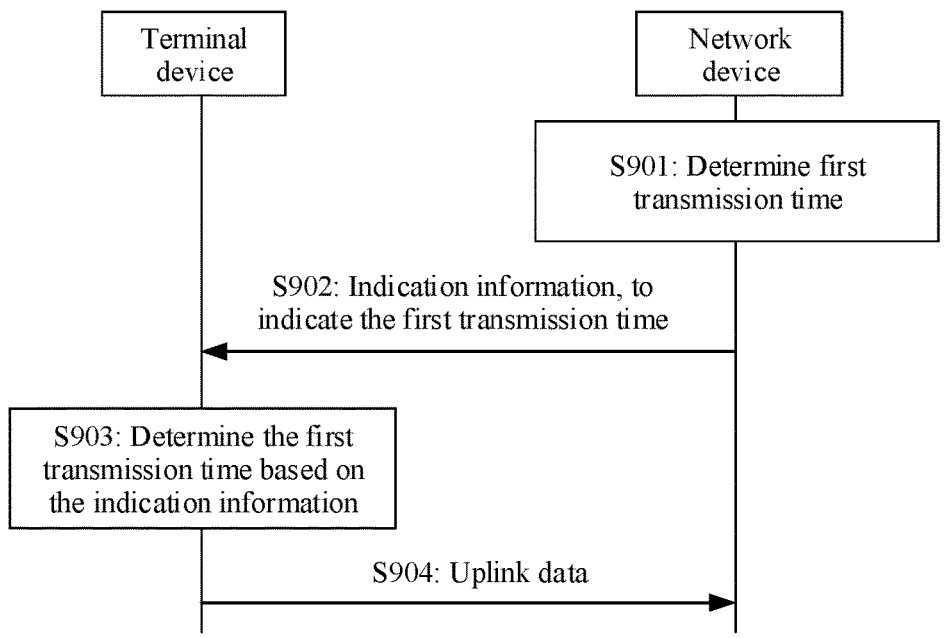
FIG. 9 is another schematic flowchart of a data transmission method according to an embodiment of this application.

The foregoing embodiment provides a data transmission method used when the terminal device determines the first transmission time based on the second transmission time. In addition, this application further provides a data transmission method used when the terminal device determines the first transmission time based on indication information or based on indication information and the second transmission time. As shown in FIG. 9, the data transmission method provided in this embodiment of this application includes the following steps.

S901: A network device determines first transmission time.

Second transmission time includes the first transmission time, the first transmission time includes N1 time units, the second transmission time includes N2 time units, N1 is a positive integer, and N2 is a positive integer greater than N1.

Optionally, in this embodiment of this application, the second transmission time may be time that is configured, scheduled, or indicated by the network device for/to a terminal device and that is used to repeatedly transmit uplink data. For related descriptions of configuring, scheduling, or indicating the second transmission time by the network device, refer to step S401. Details are not described herein again.

Optionally, when the network device determines the first transmission time, any one or any two of a quantity N1 of time units included in the first transmission time, a distribution manner of the N1 time units included in the first transmission time, and an offset between the $1^{st}$ time unit of the first transmission time and the $1^{st}$ time unit of the second transmission time may be predefined, and the other two or one that are/is not predefined are/is determined by the network device. Alternatively, the quantity N1 of time units included in the first transmission time, the distribution manner of the N1 time units included in the first transmission time, and the offset between the $1^{st}$ time unit of the first transmission time and the $1^{st}$ time unit of the second transmission time are all determined by the network device.

Optionally, in this embodiment of this application, after determining the first transmission time for receiving the uplink data, the network device needs to indicate information about the first transmission time to the terminal device, so that the terminal device sends the uplink data within the first transmission time.

S902: The network device sends indication information to the terminal device. Correspondingly, the terminal device receives the indication information from the network device.

The indication information indicates the quantity N1 of time units included in the first transmission time and/or positions of the N1 time units included in the first transmission time. The positions of the N1 time units included in the first transmission time may be a start time point of the $1^{st}$ time unit of the first transmission time and/or the distribution manner of the N1 time units included in the first transmission time. In this case, for the terminal device, no predefined information may be understood as configured or indicated by the network device.

Optionally, after determining at least one of the quantity N1 of time units included in the first transmission time, the distribution manner of the N1 time units included in the first transmission time, and the offset between the $1^{st}$ time unit of the first transmission time and the $1^{st}$ time unit of the second transmission time that are not predefined, the network device may generate the indication information based on the determined information, to indicate related information about the first transmission time to the terminal device. The indication information may be carried by using DCI, may be carried by using higher-layer configuration information, or may be carried by using a combination of higher-layer configuration information and DCI. This is not specifically limited in this embodiment of this application.

Optionally, the indication information generated and sent by the network device may have the following cases.

Case one: The indication information includes first indication information, where the first indication information is used to determine the quantity N1 of time units included in the first transmission time.

The first indication information indicates at least one of the following information: the quantity N1 of time units included in the first transmission time, a ratio of the quantity of time units included in the first transmission time to a quantity of time units included in the second transmission time, or a ratio of the quantity of time units included in the first transmission time to a quantity of time units included in transmission time other than the first transmission time in the second transmission time.

It may be understood that, in this case, the distribution manner of the N1 time units included in the first transmission time and the offset between the $1^{st}$ time unit of the first transmission time and the $1^{st}$ time unit of the second transmission time are predefined.

Case two: The indication information includes second indication information, where the second indication information is used to determine the positions of the N1 time units included in the first transmission time.

The second indication information indicates at least one of the following information: the distribution manner of the N1 time units included in the first transmission time or the offset between the $1^{st}$ time unit of the first transmission time and the $1^{st}$ time unit of the second transmission time.

It may be understood that the second indication information includes the following three cases: 1. The second indication information indicates the distribution manner of the N1 time units included in the first transmission time. In this case, information about the quantity of time units included in the first transmission time and the offset between the $1^{st}$ time unit of the first transmission time and the $1^{st}$ time unit of the second transmission time are predefined. 2. The second indication information indicates the offset between the $1^{st}$ time unit of the first transmission time and the $1^{st}$ time unit of the second transmission time. In this case, the information about the quantity of time units included in the first transmission time and the distribution manner of the N1 time units included in the first transmission time are predefined. 3. The second indication information indicates the distribution manner of the N1 time units included in the first transmission time and the offset between the $1^{st}$ time unit of the first transmission time and the $1^{st}$ time unit of the second transmission time. In this case, the information about the quantity of time units included in the first transmission time is predefined. For example, the information about the quantity of time units included in the first transmission time may be the quantity of time units included in the first transmission time, or may be the ratio of the quantity of time units included in the first transmission time to the quantity of time units included in the second transmission time, or may be the ratio of the quantity of time units included in the first transmission time to the quantity of time units included in the transmission time other than the first transmission time in the second transmission time.

Case three: The indication information includes the first indication information and the second indication information, that is, the indication information indicates the quantity N1 of time units included in the first transmission time and the positions of the N1 time units included in the first transmission time.

Optionally, based on different second indication information, the indication information may alternatively have the following three cases respectively corresponding to the three cases of the second indication information: 1. The indication information indicates the quantity N1 of time units included in the first transmission time and the distribution manner of the N1 time units included in the first transmission time. In this case, the offset between the $1^{st}$ time unit of the first transmission time and the $1^{st}$ time unit of the second transmission time is predefined. 2. The indication information indicates the quantity N1 of time units included in the first transmission time and the offset between the $1^{st}$ time unit of the first transmission time and the $1^{st}$ time unit of the second transmission time. In this case, the distribution manner of the N1 time units included in the first transmission time is predefined. 3. The indication information indicates the quantity N1 of time units included in the first transmission time, the distribution manner of the N1 time units included in the first transmission time, and the offset between the $1^{st}$ time unit of the first transmission time and the $1^{st}$ time unit of the second transmission time. In this case, the foregoing three pieces of information are all not predefined, but are determined by the network device.

It should be noted that, in addition to the foregoing provided cases, content included in the indication information may alternatively be other information indicating the first transmission time. For example, the indication information may directly indicate a specific position of the first transmission time. For example, the indication information may indicate that the first transmission time is the second time unit, the fourth time unit, the sixth time unit, and the eighth time unit that start from a moment t0. This is not specifically limited in this embodiment of this application.

Optionally, the indication information may include a plurality of bits. The quantity and positions of the time units included in the first transmission time are separately indicated in a manner in which a part of the bits are used as the first indication information and the other part of the bits are used as the second indication information. For example, as shown in Table 1, the indication information includes two bits, and the indication information indicates the quantity N1 of time units included in the first transmission time and the distribution of the N1 time units included in the first transmission time. The first bit is used as the first indication information to indicate the quantity N1 of time units included in the first transmission time, and the second bit is used as the second indication information to indicate the distribution of the N1 time units included in the first transmission time. That a value of the first bit is "0" indicates that the distribution manner of the N1 time units included in the first transmission time is a centralized manner, and that the value of the first bit is "1" indicates that the distribution manner of the N1 time units included in the first transmission time is a distributed manner. That a value of the second bit is "0" indicates that a ratio of the time units included in the first transmission time to the time units included in the second transmission time is 1:2, and that the value of the second bit is "1" indicates that the ratio of the time units included in the first transmission time to the time units included in the second transmission time is 1:4.

TABLE 1

| Value of indication information | Distribution manner | Ratio of first transmission time to second transmission time |
|---|---|---|
| 00 | Centralized manner | 1:2 |
| 01 | Centralized manner | 1:4 |
| 10 | distributed manner | 1:2 |
| 11 | distributed manner | 1:4 |

Optionally, the indication information may simultaneously indicate, in a predefining manner, the quantity and positions of the time units included in the first transmission time. In a possible implementation, the predefining manner may be that the distribution manner of the time units included in the first transmission time and the ratio of the quantity of time units included in the first transmission time to the quantity of time units included in the second transmission time are indicated by using different values of all the bits of the indication information. That is, each value of all the bits of the indication information corresponds a group of the distribution manner and the ratio. For example, all the bits of the indication information are two bits. A correspondence between the value of all the bits of the indication information, and the distribution manner and the ratio may be shown in Table 2. For example, that the value of the two bits of the indication information is "00" corresponds to that the distribution manner of the time units included in the first transmission time is the centralized manner, and the ratio of the quantity of time units included in the first transmission time to the quantity of time units included in the second transmission time is 1:2.

TABLE 2

| Value of indication information | Distribution manner | Ratio of first transmission time to second transmission time |
|---|---|---|
| 00 | Centralized manner | 1:2 |
| 01 | Centralized manner | 1:4 |
| 10 | Centralized manner | 1:8 |
| 11 | distributed manner | 1:2 |

It may be understood that the indication information may alternatively indicate the quantity and positions of the time units included in the first transmission time in another form. This is not specifically limited in this embodiment of this application.

Optionally, after receiving the indication information, the terminal device may perform the following step S903.

S903: The terminal device determines the first transmission time based on the indication information.

Optionally, based on the different content indicated by the indication information, when the terminal device determines the first transmission time, the following different cases may also exist.

Figure 10A:
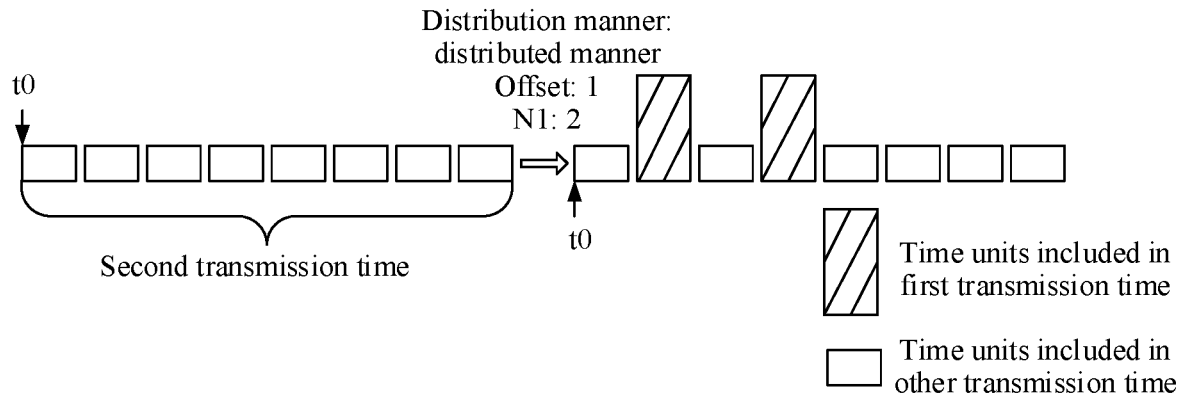
FIG. 10a is a schematic diagram 2 of determining first transmission time by a terminal device according to an embodiment of this application.

Case one: The indication information includes the first indication information. That the terminal device determines the first transmission time based on the indication information includes:

The terminal device determines the first transmission time based on the first indication information, the second transmission time, the predefined distribution manner of the N1 time units included in the first transmission time, and the predefined offset between the $1^{st}$ time unit of the first transmission time and the $1^{st}$ time unit of the second transmission time. For example, the first indication information indicates that the quantity of time units included in the first transmission time is two, the predefined distribution manner is that every four time units included in the second transmission time include two time units of the first transmission time and the two time units are not adjacent, and the offset between the $1^{st}$ time unit of the first transmission time and the $1^{st}$ time unit of the second transmission time is one. As shown in FIG. 10a, the time units that are finally determined by the terminal device and that are included in the first transmission time are the second time unit and the fourth time unit that start from a moment t0.

Case two: The indication information includes the second indication information. Based on the different content indicated by the second indication information, when the terminal device determines the first time based on the indication information, the following three cases may also exist.

Figure 10B:
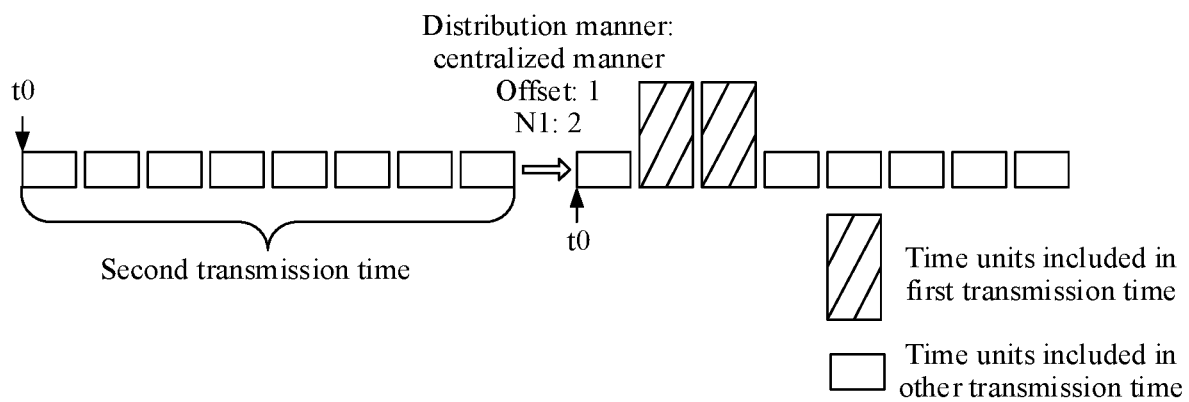
FIG. 10b is a schematic diagram 3 of determining first transmission time by a terminal device according to an embodiment of this application.

1. The second indication information indicates the offset between the $1^{st}$ time unit of the first transmission time and the $1^{st}$ time unit of the second transmission time. That the terminal device determines the first transmission time includes: The terminal device determines the first transmission time based on the second indication information, the second transmission time, the preset quantity N1 of time units included in the first transmission time, and the distribution manner of the N1 time units included in the first transmission time. For example, the offset indicated by the second indication information is one, the predefined quantity of time units included in the first transmission time is two, and the distribution manner of the N1 time units included in the first transmission time is the centralized manner. As shown in FIG. 10b, the time units that are finally determined by the network device and that are included in the first transmission time are the second time unit and the third time unit that start from a moment t0.

Figure 10C:
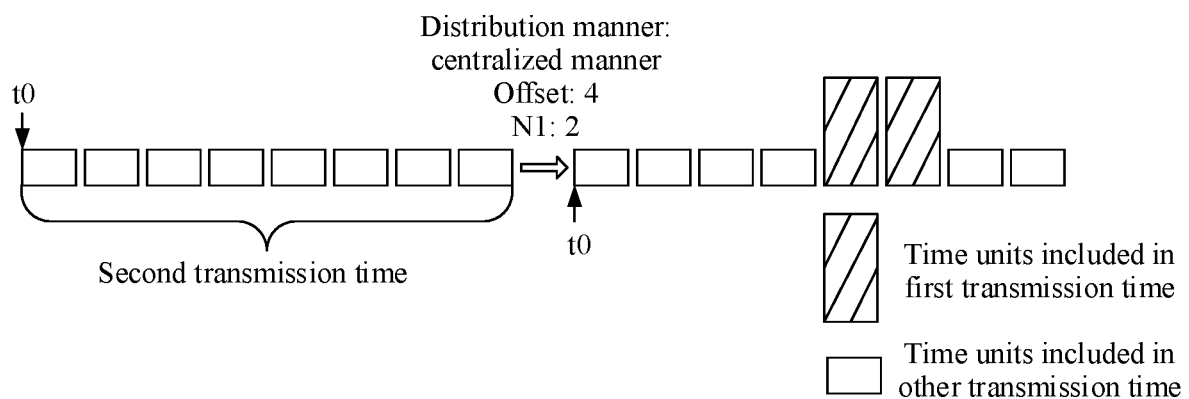
FIG. 10c is a schematic diagram 4 of determining first transmission time by a terminal device according to an embodiment of this application.

2. The second indication information indicates the distribution manner of the N1 time units included in the first transmission time. That the terminal device determines the first transmission time includes: The terminal device determines the first transmission time based on the second indication information, the second transmission time, the preset quantity N1 of time units included in the first transmission time, and the offset between the $1^{st}$ time unit of the first transmission time and the $1^{st}$ time unit of the second transmission time. For example, the distribution manner indicated by the second indication information is the centralized manner, the predefined quantity of time units included in the first transmission time is two, and the predefined offset between the $1^{st}$ time unit of the first transmission time and the $1^{st}$ time unit of the second transmission time is 4. As shown in FIG. 10c, time units that are finally determined by the terminal device and that are included in the first transmission time are the fifth time unit and the sixth time unit that start from a moment t0.

Figure 10D:
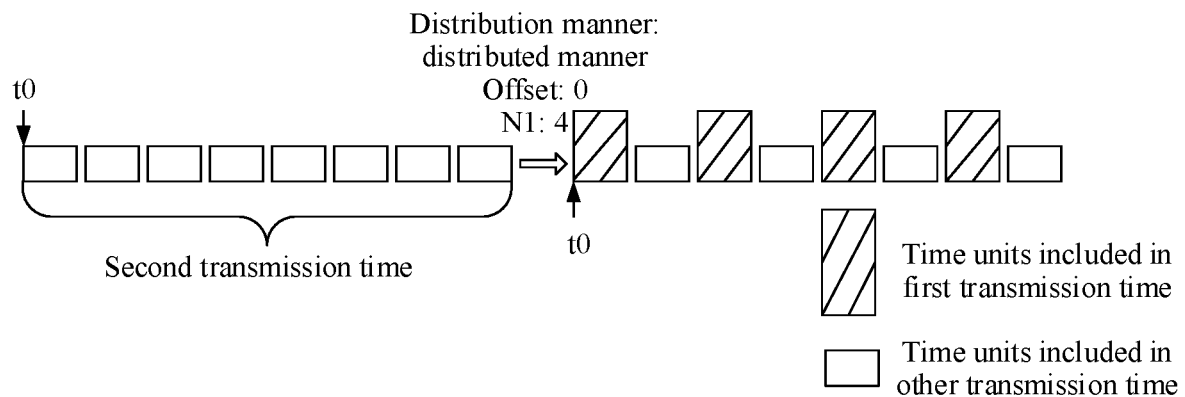
FIG. 10d is a schematic diagram 5 of determining first transmission time by a terminal device according to an embodiment of this application.

3. The second indication information indicates the distribution manner of the N1 time units included in the first transmission time and the offset between the $1^{st}$ time unit of the first transmission time and the $1^{st}$ time unit of the second transmission time. That the terminal device determines the first transmission time includes: The terminal device determines the first transmission time based on the second indication information, the second transmission time, and the preset quantity N1 of time units included in the first transmission time. For example, the distribution manner indicated by the second indication information is that every four time units of the second transmission time include two time units of the first transmission time, and the two time units are not adjacent, the offset is zero, and the predefined quantity N1 of time units included in the first transmission time is four. As shown in FIG. 10*d*, the time units that are finally determined by the terminal device and that are included in the first transmission time are the first time unit, the third time unit, the fifth time unit, and the seventh time unit that start from a moment t0.

Case three: The indication information includes the first indication information and the second indication information, that is, the indication information indicates the quantity N1 of time units included in the first transmission time and the positions of the N1 time units included in the first transmission time. Based on the different content indicated by the second indication information, when the terminal device determines the first time based on the indication information, the following three cases may also exist.

1. The indication information indicates the quantity N1 of time units included in the first transmission time and the distribution manner of the N1 time units included in the first transmission time. That the terminal device determines the first transmission time includes: The terminal device determines the first transmission time based on the indication information, the second transmission time, and the preset offset between the $1^{st}$ time unit of the first transmission time and the $1^{st}$ time unit of the second transmission time.
2. The indication information indicates the quantity N1 of time units included in the first transmission time and the offset between the $1^{st}$ time unit of the first transmission time and the $1^{st}$ time unit of the second transmission time. That the terminal device determines the first transmission time includes: The terminal device determines the first transmission time based on the indication information, the second transmission time, and the preset distribution manner of the N1 time units included in the first transmission time.
3. The indication information indicates the quantity N1 of time units included in the first transmission time, the distribution manner of the N1 time units included in the first transmission time, and the offset between the $1^{st}$ time unit of the first transmission time and the $1^{st}$ time unit of the second transmission time. That the terminal device determines the first transmission time includes: The terminal device determines the first transmission time based on the indication information and the second transmission time.

It should be noted that when the indication information directly indicates the position of each of the N1 time units included in the first transmission time, the terminal device may directly determine the first transmission time based on the indication information without referring to the second transmission time. For example, the indication information may indicate that the first transmission time is the second time unit, the fourth time unit, the sixth time unit, and the eighth time unit that start from a moment t0. In this case, the terminal device may determine, as the first transmission time, the second time unit, the fourth time unit, the sixth time unit, and the eighth time unit that start from the moment t0.

Optionally, after determining the first transmission time, the terminal device may perform the following step S904.

S904: The terminal device sends the uplink data at a first power within the first transmission time. Correspondingly, the network device receives the uplink data within the first transmission time.

The first power does not exceed a first maximum power, the first maximum power is greater than a second maximum power, and the second maximum power is a corresponding maximum power for sending the uplink data within the second transmission time. For a specific implementation, refer to related descriptions in step S403, and details are not described herein again.

According to the data transmission method provided in this embodiment of this application, the terminal device sends the uplink data only within the first transmission time included in the second transmission time and does not send the uplink data within other transmission time of the second transmission time, and is allowed to send the uplink data at a power greater than the second maximum power within the part of transmission time. Therefore, sending time of the terminal device is reduced, and a transmit power within short time is improved, so that the terminal device can improve performance of demodulating the uplink data when it is ensured that the transmit power within the allocated transmission time does not exceed a maximum power value specified in a law or regulation.

The processor 301 in the network device 30 shown in FIG. 2 may invoke application program code stored in the memory 302, to indicate the network device to perform actions performed by the network device in steps S901 to S904. The processor 201 in the terminal device 20 shown in FIG. 2 may invoke application program code stored in the memory 202, to indicate the terminal device to perform actions performed by the terminal device in steps S901 to S904. This is not limited in this embodiment.

It should be noted that although the data transmission method shown in FIG. 4 or FIG. 9 provided in the foregoing embodiments of this application is based on a scenario in which the terminal device repeatedly transmits the uplink data, it may be understood that the data transmission method shown in FIG. 4 or FIG. 9 may alternatively be applied to another scenario, for example, a scenario in which a network device repeatedly transmits downlink data, a scenario in which data is transmitted between terminal devices, or a scenario in which data is transmitted between a vehicle-mounted terminal and another node.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component (for example, a chip or a circuit) that can be used in the network device.

The solutions provided in the embodiments of this application are mainly described above from a perspective of interaction between network elements. Correspondingly, an embodiment of this application further provides a communication apparatus. The communication apparatus is configured to implement the foregoing methods. The communication apparatus may be the terminal device in the foregoing method embodiment, or an apparatus including the foregoing terminal device, or a component that can be used in the terminal device. Alternatively, the communication apparatus may be the network device in the foregoing method embodiment, or an apparatus including the foregoing network device, or a component that can be used in the network device. It can be understood that, to implement the foregoing functions, the communication apparatus includes a corresponding hardware structure and/or software module for performing the functions. A person of ordinary skill in the art should easily be aware that, in combination with the examples described in the embodiments disclosed in this specification, units, algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely a logical function division. In an actual implementation, another division manner may be used.

Figure 11:
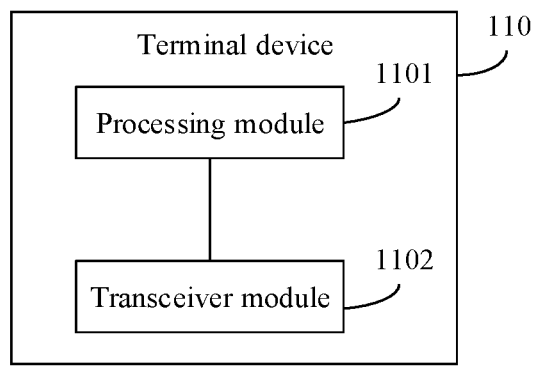
FIG. 11 is still another schematic diagram of a structure of a terminal device according to an embodiment of this application.

For example, the communication apparatus is the terminal device in the foregoing method embodiments. FIG. 11 is a schematic diagram of a structure of a terminal device 110. The terminal device 110 includes a processing module 1101 and a transceiver module 1102. The transceiver module 1102 may also be referred to as a transceiver unit, and is configured to implement a sending and/or receiving function, for example, may be a transceiver circuit, a transceiver machine, a transceiver, or a communication interface.

In a possible implementation, the processing module 1101 is configured to determine first transmission time, where second transmission time includes the first transmission time, the first transmission time includes N1 time units, the second transmission time includes N2 time units, N1 is a positive integer, and N2 is a positive integer greater than N1. The transceiver module 1102 is configured to send uplink data at a first power within the first transmission time, where the first power does not exceed a first maximum power, the first maximum power is greater than a second maximum power, and the second maximum power is a corresponding maximum power for sending the uplink data within the second transmission time.

Optionally, that the processing module 1101 is configured to determine first transmission time includes: the processing module 1101 is configured to determine the first transmission time based on at least one of indication information and the second transmission time, where the indication information indicates at least one of the following: a quantity N1 of time units included in the first transmission time and positions of the N1 time units included in the first transmission time.

Optionally, that the processing module 1101 is configured to determine the first transmission time based on at least one of indication information and the second transmission time includes: the processing module 1101 is configured to determine the first transmission time based on the second transmission time and based on predefined information about the quantity of time units included in the first transmission time, a predefined distribution manner of the N1 time units included in the first transmission time, and a predefined offset between the $1^{st}$ time unit of the first transmission time and the $1^{st}$ time unit of the second transmission time.

All related content of the steps in the foregoing method embodiments may be cited in function descriptions of corresponding functional modules. Details are not described herein again.

In this embodiment, the terminal device 110 is presented in a form of functional modules obtained through division in an integrated manner. The "module" herein may be an ASIC, a processor and a memory for executing one or more software or firmware programs, an integrated logic circuit, and/or another component that can provide the foregoing function. In a simple embodiment, a person skilled in the art may figure out that the terminal device 110 may be in a form of the terminal device 20 shown in FIG. 2.

For example, the processor 201 in the terminal device 20 in FIG. 2 may invoke the computer-executable instructions stored in the memory 202, so that the terminal device 20 performs the data transmission methods in the foregoing method embodiments.

Specifically, the processor 201 in the terminal device 20 shown in FIG. 2 may invoke the computer-executable instructions stored in the memory 202, to implement functions/implementation processes of the processing module 1101 and the transceiver module 1102 in FIG. 11. Alternatively, the processor 201 in the terminal device 20 shown in FIG. 2 may invoke the computer-executable instructions stored in the memory 202, to implement functions/implementation processes of the processing module 1101 in FIG. 11, and the transceiver 203 in the terminal device 20 shown in FIG. 2 may implement functions/implementation processes of the transceiver module 1102 in FIG. 11.

Because the terminal device 110 provided in this embodiment may perform the foregoing data transmission method, for a technical effect that can be achieved by the terminal device 110, refer to the foregoing method embodiments. Details are not described herein again.

Figure 12:
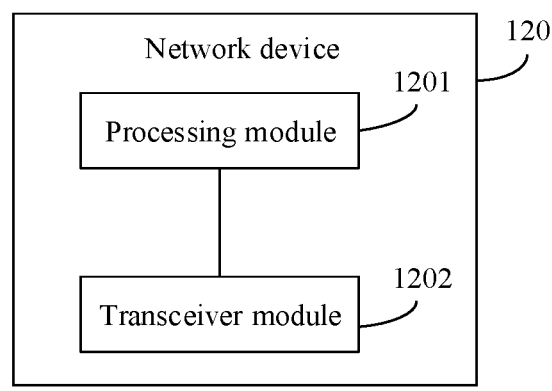
FIG. 12 is another schematic diagram of a structure of a network device according to an embodiment of this application.

Alternatively, for example, the communication apparatus is the network device in the foregoing method embodiment. FIG. 12 is a schematic diagram of a structure of a network device 120. The network device 120 includes a processing module 1201 and a transceiver module 1202. The transceiver module 1202 may also be referred to as a transceiver unit, and is configured to implement a sending and/or receiving function, for example, may be a transceiver circuit, a transceiver machine, a transceiver, or a communication interface.

In a possible implementation, the processing module 1201 is configured to determine first transmission time, where second transmission time includes the first transmission time, the first transmission time includes N1 time units, the second transmission time includes N2 time units, N1 is a positive integer, and N2 is a positive integer greater than N1. The transceiver module 1202 is configured to receive uplink data within the first transmission time.

Optionally, the transceiver module 1202 is further configured to send indication information to a terminal device, where the indication information indicates at least one of the following: a quantity N1 of time units included in the first transmission time and positions of the N1 time units included in the first transmission time.

All related content of the steps in the foregoing method embodiments may be cited in function descriptions of corresponding functional modules. Details are not described herein again.

In this embodiment, the network device 120 is presented in a form of functional modules obtained through division in an integrated manner. The "module" herein may be an ASIC, a processor and a memory for executing one or more software or firmware programs, an integrated logic circuit, and/or another component that can provide the foregoing function. In a simple embodiment, a person skilled in the art may figure out that the network device 120 may be in a form of the network device 30 shown in FIG. 2.

For example, the processor 301 in the network device 30 in FIG. 2 may invoke the computer-executable instructions stored in the memory 302, so that the network device 30 performs the data transmission methods in the foregoing method embodiments.

Specifically, the processor 301 in the network device 30 shown in FIG. 2 may invoke the computer-executable instructions stored in the memory 302, to implement functions/implementation processes of the processing module 1201 and the transceiver module 1202 in FIG. 12. Alternatively, the processor 301 in the network device 30 shown in FIG. 2 may invoke the computer-executable instructions stored in the memory 302, to implement functions/implementation processes of the processing module 1201 in FIG. 12, and the transceiver 303 in the network device 30 shown in FIG. 2 may implement functions/implementation processes of the transceiver module 1202 in FIG. 12.

Because the network device 120 provided in this embodiment may perform the foregoing data transmission method, for a technical effect that can be achieved by the network device 120, refer to the foregoing method embodiments. Details are not described herein again.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to indicate the communication apparatus to perform the method in any one of the foregoing method embodiments. Certainly, the memory may not be in the communication apparatus. When the communication apparatus is the chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like. In this embodiment of this application, the computer may include the foregoing apparatus.

Although this application is described with reference to the embodiments, in a process of implementing this application that claims protection, persons skilled in the art may understand and implement another variation of the disclosed embodiments by viewing the accompanying drawings, disclosed content, and the appended claims. In the claims, "comprising (comprising)" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data transmission method, comprising:
    determining, by a terminal device, a first transmission time, wherein a second transmission time comprises the first transmission time, the first transmission time comprises N1 time units, the second transmission time comprises N2 time units, N1 is a positive integer, and N2 is a positive integer greater than N1; and
    sending, by the terminal device, uplink data at a first power within the first transmission time, wherein the first power does not exceed a first maximum power, the first maximum power is greater than a second maximum power, and the second maximum power is a corresponding maximum power for sending the uplink data within the second transmission time, wherein the determining, by a terminal device, a first transmission time comprises:
    determining, by the terminal device, the first transmission time based on at A least one of indication information, wherein the indication information indicates at least one of the following: a quantity N1 of time units comprised in the first transmission time and positions of the N1 time units comprised in the first transmission time, and
    wherein the indication information comprises second indication information, the second indication information is used to determine the positions of the N1 time units comprised in the first transmission time, and the second indication information indicates at least one of the following:

a distribution manner of the N1 time units comprised in the first transmission time; and an offset between the first time unit of the first transmission time and the first time unit of the second transmission time.

2. The method according to claim 1, wherein the indication information comprises first indication information, the first indication information is used to determine the quantity N1 of time units comprised in the first transmission time, and the first indication information indicates at least one of the following:

the quantity of time units comprised in the first transmission time;

a ratio of the quantity of time units comprised in the first transmission time to a quantity of time units comprised in the second transmission time; and a ratio of the quantity of time units comprised in the first transmission time to a quantity of time units comprised in transmission time other than the first transmission time in the second transmission time.

3. The method according to claim 1, wherein the determining, by the terminal device, the first transmission time based on at least one of indication information and the second transmission time comprises:

determining, by the terminal device, the first transmission time based on the second transmission time and based on predefined information about the quantity of time units comprised in the first transmission time, a predefined distribution manner of the N1 time units comprised in the first transmission time, and a predefined offset between the first time unit of the first transmission time and the first time unit of the second transmission time.

4. The method according to claim 1, wherein the first maximum power is determined based on the second maximum power and a power offset value and the power offset value is associated with N1 and N2.

5. A data transmission method, comprising:

determining, by a network device, a first transmission time, wherein a second transmission time comprises the first transmission time, the first transmission time comprises N1 time units, the second transmission time comprises N2 time units, N1 is a positive integer, and N2 is a positive integer greater than N1; and receiving, by the network device, uplink data within the first transmission time wherein an indication information comprises second indication information, the second indication information is used to determine the positions of the N1 time units comprised in the first transmission time, and the second indication information indicates at least one of the following:

a distribution manner of the N1 time units comprised in the first transmission time; and an offset between the first time unit of the first transmission time and the first time unit of the second transmission time.

6. The method according to claim 5, wherein before the receiving, by the network device, uplink data, the method further comprises:

sending, by the network device, indication information to a terminal device, wherein the indication information indicates at least one of the following: a quantity N1 of time units comprised in the first transmission time and positions of the N1 time units comprised in the first transmission time.

7. The method according to claim 6, wherein the indication information comprises first indication information, the first indication information is used to determine the quantity N1 of time units comprised in the first transmission time, and the first indication information indicates at least one of the following:

the quantity of time units comprised in the first transmission time;

a ratio of the quantity of time units comprised in the first transmission time to a quantity of time units comprised in the second transmission time; and a ratio of the quantity of time units comprised in the first transmission time to a quantity of time units comprised in transmission time other than the first transmission time in the second transmission time.

8. A communications apparatus, comprising:

at least one processor; and a non-transitory memory storing programming instructions for execution by the at least one processor, the programming instructions instructing the communications apparatus to perform operations comprising:

determining a first transmission time, wherein a second transmission time comprises the first transmission time, the first transmission time comprises N1 time units, the second transmission time comprises N2 time units, N1 is a positive integer, and N2 is a positive integer greater than N1; and sending uplink data at a first power within the first transmission time to a network device, wherein the first power does not exceed a first maximum power, the first maximum power is greater than a second maximum power, and the second maximum power is a corresponding maximum power for sending the uplink data within the second transmission time, wherein the determining a first transmission time comprises:

determining the first transmission time based on at least one of indication information, wherein the indication information indicates at least one of the following: a quantity N1 of time units comprised in the first transmission time and positions of the N1 time units comprised in the first transmission time, and wherein the indication information comprises second indication information, the second indication information is used to determine the positions of the N1 time units comprised in the first transmission time, and the second indication information indicates at least one of the following:

a distribution manner of the N1 time units comprised in the first transmission time; and an offset between the first time unit of the first transmission time and the first time unit of the second transmission time.

9. The apparatus according to claim 8, wherein the indication information comprises first indication information, the first indication information is used to determine the quantity N1 of time units comprised in the first transmission time, and the first indication information indicates at least one of the following:

the quantity of time units comprised in the first transmission time;

a ratio of the quantity of time units comprised in the first transmission time to a quantity of time units comprised in the second transmission time; and a ratio of the quantity of time units comprised in the first transmission time to a quantity of time units comprised in transmission time other than the first transmission time in the second transmission time.

10. The apparatus according to claim 8, wherein the determining the first transmission time based on at least one of indication information and the second transmission time comprises:

determining the first transmission time based on the second transmission time and based on predefined information about the quantity of time units comprised in the first transmission time, a predefined distribution manner of the N1 time units comprised in the first transmission time, and a predefined offset between the first time unit of the first transmission time and the first time unit of the second transmission time.

11. The apparatus according to claim 8, wherein the first maximum power is determined based on the second maximum power and a power offset value and the power offset value is associated with N1 and N2.

12. A communications apparatus, comprising:

at least one processor; and a non-transitory memory storing programming instructions for execution by the at least one processor, the programming instructions instructing the communications apparatus to perform operations comprising:

determining a first transmission time, wherein a second transmission time comprises the first transmission time, the first transmission time comprises N1 time units, the second transmission time comprises N2 time units, N1 is a positive integer, and N2 is a positive integer greater than N1; and receiving, from a terminal device, uplink data within the first transmission time, wherein the indication information comprises second indication information, the second indication information is used to determine the positions of the N1 time units comprised in the first transmission time, and the second indication information indicates at least one of the following:

a distribution manner of the N1 time units comprised in the first transmission time; and an offset between the first time unit of the first transmission time and the first time unit of the second transmission time.

13. The apparatus according to claim 12, the operations further comprises:

sending indication information to the terminal device, wherein the indication information indicates at least one of the following: a quantity N1 of time units comprised in the first transmission time and positions of the N1 time units comprised in the first transmission time.

14. The apparatus according to claim 13, wherein the indication information comprises first indication information, the first indication information is used to determine the quantity N1 of time units comprised in the first transmission time, and the first indication information indicates at least one of the following:

the quantity of time units comprised in the first transmission time;

a ratio of the quantity of time units comprised in the first transmission time to a quantity of time units comprised in the second transmission time; and a ratio of the quantity of time units comprised in the first transmission time to a quantity of time units comprised in transmission time other than the first transmission time in the second transmission time.

* * * * *

UNITED STATES PATENT AND TRADEMARK OFFICE
CERTIFICATE OF CORRECTION

| | | |
|---|---|---|
| PATENT NO. | : 12,082,127 B2 | Page 1 of 1 |
| APPLICATION NO. | : 17/538600 | |
| DATED | : September 3, 2024 | |
| INVENTOR(S) | : Fei et al. | |

It is certified that error appears in the above-identified patent and that said Letters Patent is hereby corrected as shown below:

In the Claims

Claim 1: Column 28, Line 56: "time based on at A least one of indication information," should read as -- time based on at least one of indication information, --.

Signed and Sealed this
Sixth Day of May, 2025

Coke Morgan Stewart
*Acting Director of the United States Patent and Trademark Office*